United States Patent [19]

Cho et al.

[11] Patent Number: 5,569,111
[45] Date of Patent: Oct. 29, 1996

[54] PERMANENT MAGNET TORQUE/FORCE TRANSFER APPARATUS

[75] Inventors: Chahee P. Cho, Portsmouth; Ralph A. Bedingfield, Middletown, both of R.I.

[73] Assignee: The United States of America as represented by the Secretary of the Navy, Washington, D.C.

[21] Appl. No.: 322,655

[22] Filed: Oct. 11, 1994

[51] Int. Cl.$^6$ .......................... F16H 13/12; H02K 49/10
[52] U.S. Cl. ............................. 475/149; 310/103
[58] Field of Search .................... 310/75 D, 83, 310/103, 152, 156; 475/149, 331

[56] References Cited

U.S. PATENT DOCUMENTS

| | | | |
|---|---|---|---|
| 1,962,659 | 6/1934 | Kautz | 310/103 |
| 2,497,659 | 2/1950 | Davis et al. | 475/149 X |
| 5,013,949 | 5/1991 | Mabe, Jr. | 310/103 X |

FOREIGN PATENT DOCUMENTS

| | | | |
|---|---|---|---|
| 476357 | 3/1992 | European Pat. Off. | 475/149 |
| 109163 | 8/1980 | Japan | 310/103 |
| 2060 | 1/1987 | Japan | 475/149 |
| 210449 | 9/1988 | Japan | 475/149 |
| 404331848 | 11/1992 | Japan . | |
| 120167 | 12/1957 | U.S.S.R. | 310/103 |
| 699621 | 11/1979 | U.S.S.R. | 310/103 |

*Primary Examiner*—Khoi Q. Ta
*Attorney, Agent, or Firm*—Michael J. McGowan; Michael F. Oglo; Prithvi C. Lall

[57] ABSTRACT

A torque/force transfer apparatus which includes an annular ring having therein permanent first magnets side by side about the interior of the ring. The first magnets are arranged so as to alternate in polar orientation to present an inside circumference of alternating north and south magnetic poles. A cylindrical central member has therein permanent second magnets side by side about the exterior of the central member. The second magnets are arranged so as to alternate in polar orientation to present an outside circumference of alternating north and south magnetic poles. A strut assembly is pivotally attached to a center of a side of the central member and has arms extending radially outwardly from the central member center and is provided with planetary members rotatably connected each to one of the arms. The planetary members each have therein permanent third magnets side by side about the exterior of the planetary member, the third magnets being arranged so as to alternate in polar orientation to present an outside circumference of alternating north and south magnetic poles. Each of the planetary members substantially bridges an annulus defined by the ring inside circumference and the central member outside circumference, whereby rotation of the central member causes, by magnetic flux, rotation of the planetary members which cause, by magnetic flux, rotation of the ring.

2 Claims, 4 Drawing Sheets

5,569,111

PERMANENT MAGNET TORQUE/FORCE TRANSFER APPARATUS

STATEMENT OF GOVERNMENT INTEREST

The invention described herein may be manufactured and used by or for the Government of the U.S. of America for governmental purposes without payment of any royalties thereon or therefor.

BACKGROUND OF THE INVENTION (1) Field of the Invention

The invention relates to devices for transferring rotational or translational torque and/or force and is directed more particularly to such devices utilizing permanent magnets rather than customary gear teeth.

(2) Description of the Prior Art

The predominant means for transferring torque and/or force from one rotational device to another, or from a translational device to a rotational device, or vice versa, is by physical interaction of gear teeth. The amount of energy (torque/force) that can be transferred from one gear element or device to another is dependent upon a number of parameters, including the radius of primary and/or secondary rotational gear elements, tooth size and number, and speed of rotational or translational motion. The tooth size changes over a period of time as a result of normal usage because of surface contact. All mechanized gears suffer from such inherent problems. The tangential forces passed between gears are transmitted through relatively small contact areas, leading to tooth deformation with consequent vibration and, eventually, creation of "dead zones", back lash, shock impact disturbance, and the like.

There is thus a need for torque/force transfer devices capable of carrying large torque/force loads, without physical gear teeth or other physical torque/force conducting surfaces.

SUMMARY OF THE INVENTION

It is therefore, an object of the invention to provide a torque/force transfer apparatus having no gear teeth but capable of transferring large torque/force loads.

A further object of the invention is to provide such apparatus having further facility for acting as a vibration damping means while transferring torque/force.

A still further object is to provide such apparatus having facility for adjustment to impulsive forces and for torque ripple reduction while transferring torque/force between rotational and other rotational or translational elements.

Still another object is to provide such apparatus having facility for automatic alignment between operative elements while transferring torque/force between elements.

With the above and other objects in view, as will hereinafter appear, a feature of the present invention is the provision of a torque/force transfer apparatus comprising a rigid annular ring having therein permanent first magnets side by side about the interior of the ring. The first magnets are arranged so as to alternate in polar orientation to present an inside circumference of alternating north and south magnetic poles. The apparatus further comprises a cylindrical central member having therein permanent second magnets side by side about the exterior of the central member. The second magnets are arranged so as to alternate in polar orientation to present an outside circumference of alternating north and south magnetic poles.

The apparatus is provided with a strut assembly pivotally attached to a center of a side of the central member and having arms extending radially outwardly from the central member center, and is provided with planetary members rotatably connected each to one of the arms. The planetary members each have therein permanent third magnets side by side about the exterior of the planetary member, the third magnets being arranged so as to alternate in polar orientation to present an outside circumference of alternating north and south magnetic poles. Each of the planetary members substantially bridges an annulus defined by the ring inside circumference and the central member outside circumference, whereby rotation of the central member causes, by magnetic flux, rotation of the planetary members which cause, by magnetic flux, rotation of the ring.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENT

Figure 1:
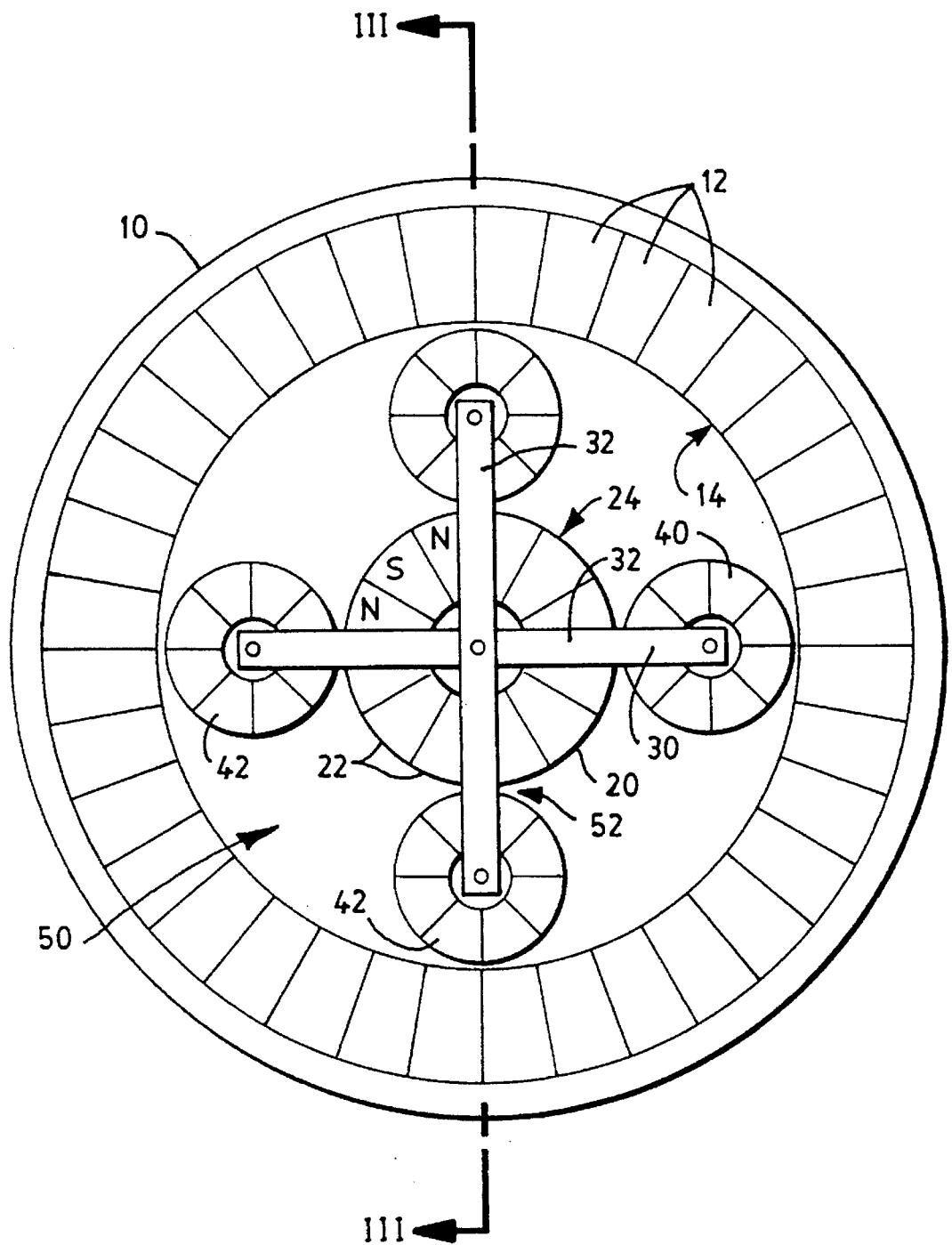
FIG. 1 is a side elevational view of a torque/force transfer apparatus, illustrative of an embodiment of the invention.
Figure 4:
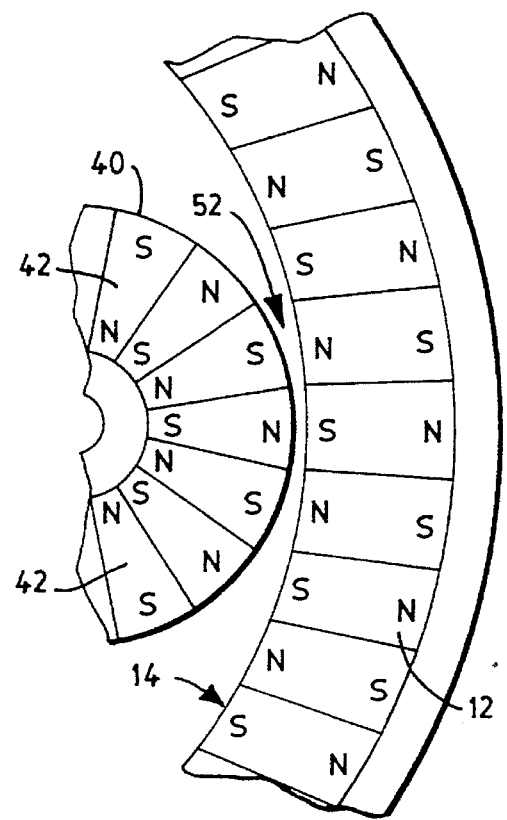
FIG. 4 is a diagrammatic view of a portion of the apparatus of FIG, 1 or FIG. 2.

Referring to FIG. 1, it will be seen that an illustrative torque/force transfer apparatus includes a rigid annular ring 10 of magnetic material. Fixed to the interior of ring 10 are permanent magnets 12 disposed side by side about the interior of the ring, arranged so as to alternate in polar orientation (FIG. 4) to present an inside circumference 14 of alternating north and south magnetic poles N,S.

A cylindrical central member 20 has mounted thereon permanent magnets 22 disposed side by side about the exterior of member 20, magnets 22 being arranged so as to alternate in polar orientation to present an outside circumference 24 of alternating north and south magnetic poles N,S.

Figure 5:
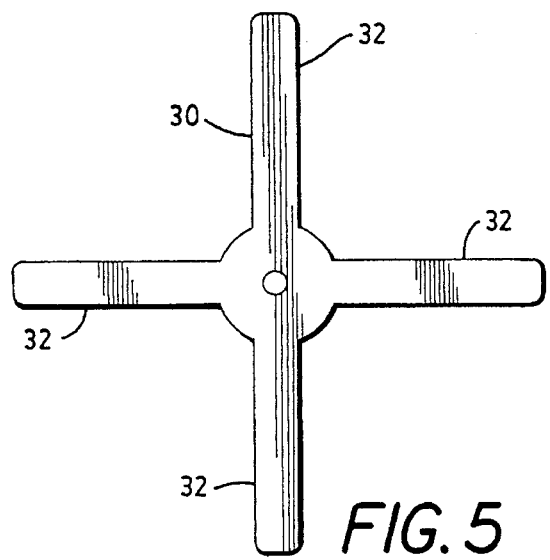
FIGS. 5–7 are illustrations of alternative embodiments of strut assembly portions of the apparatus.

A strut assembly 30 is pivotally attached to a center of a side of the central member 20 and is provided with arms 32 extending radially outwardly from the central member center. As shown in FIG. 1, arms 32 may be four in number formed by two members pivotally mounted at their centers. Alternatively, strut assembly 30 may be one rigid member, as shown in FIGS. 5 and 7, or may comprise four independently mounted pivotally moveable arms, as shown in FIG. 6.

Figure 2:
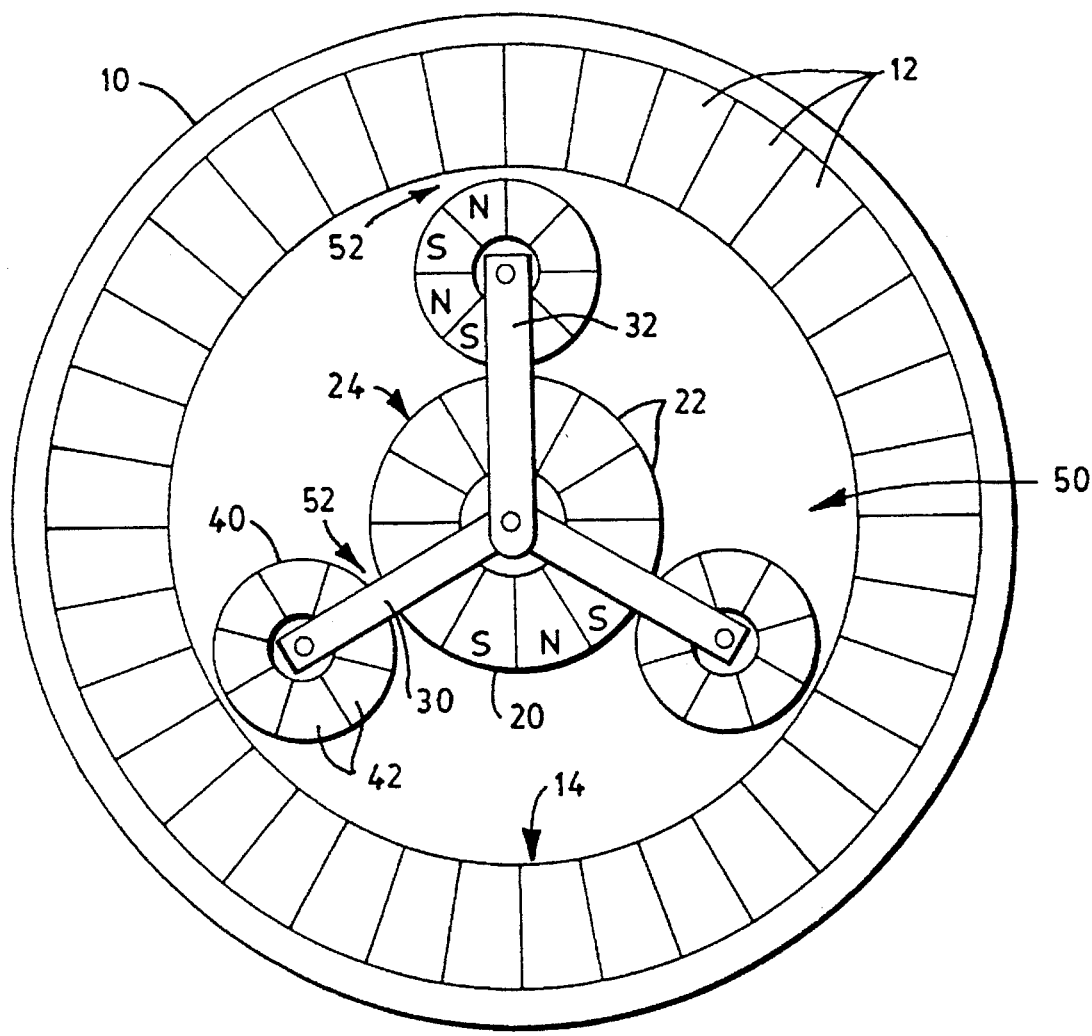
FIG. 2 is similar to FIG. 1, but showing an alternative embodiment of the illustration.
Figure 3:
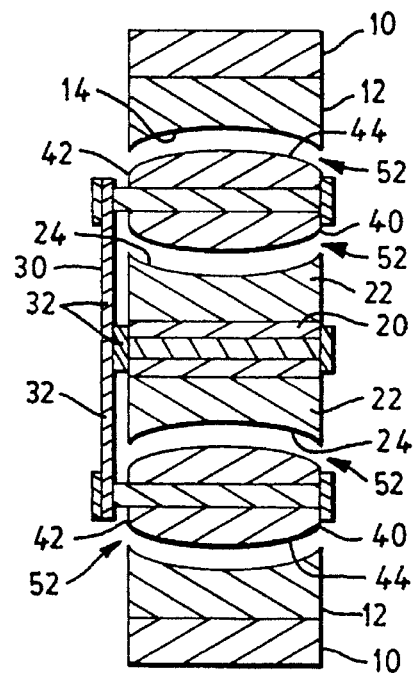
FIG. 3 is a sectional view taken along line III—III of FIG. 1.

In FIG. 2, there is shown an alternative embodiment of transfer device wherein the strut assembly 30 comprises three arms 32 which are independently mounted pivotally moveable arms. Alternatively, as shown in FIG. 7, the strut assembly may comprise a single rigid member.

Figure 6:
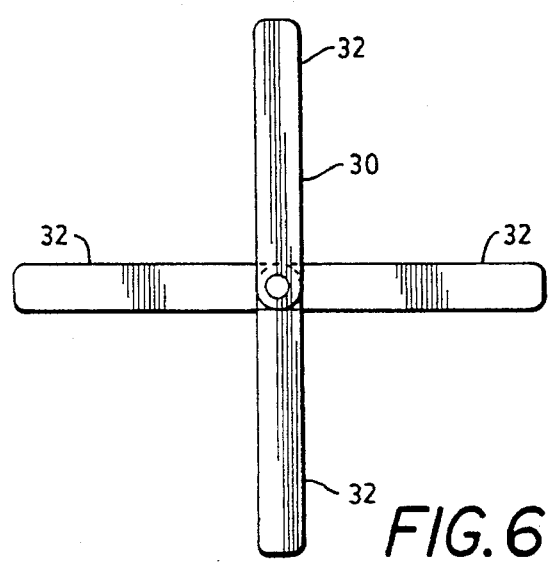
Figure 7:
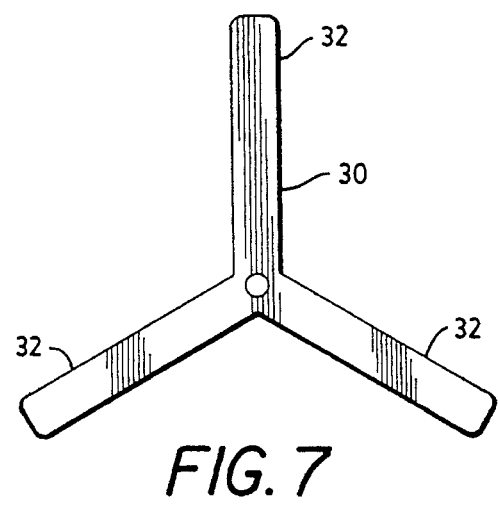

The embodiments illustrated in FIGS. 1,2 and 6 are preferred inasmuch as these embodiments provide for greater flexibility in operation, as will be discussed hereinafter.

Planetary members 40 are rotatably connected each to one of the arms 32. Each of the planetary members 40 has mounted therein permanent magnets 42 side by side about the exterior of the planetary member, the magnets being arranged so as to alternate in polar orientation to present an outside circumference 44 of alternating north and south magnetic poles N,S.

Each of the planetary members 40 substantially bridges an annulus 50 defined by ring inside circumference 14 and central member outside circumference 24, though spaced from circumferential surfaces 14, 24 by a very small gap 52, such that contact between planetary members 40 and circumferential surfaces 14, 24 is not made.

In operation, a driving device (not shown) may be connected to central member 20 in such manner as to impart rotary motion to the central member. Upon rotation of central member 20, the magnetic interaction of magnets 22 of central member 20 and magnets 42 of planetary members 40, causes rotation of planetary members 42. Similarly, upon rotation of planetary members 40, the magnetic interaction of planetary member magnets 42 and ring magnets 12 causes rotation of ring 10. The motion of the driving device (not shown) is thereby transferred to ring 10.

The interacting magnets 12, 42 and 22 are of substantially equal arc length and opposed magnets match precisely size-wise. To step up or step down the transferred speed of rotation requires selection of appropriate radii for the ring inside circumferential surface 14, the planetary members' outside circumferential surface 44, and the central member's outside circumferential surface 24, as is known in the art of meshing gears.

In the event that vibrations accompany the input driving motion, or an isolated impulsive force, or a "torque ripple" effect, the planetary members 40, on the arms 32, are able to digress slightly from their normal 90° orientation (relative to each other), as shown in FIG. 1, or 120° orientation, as shown in FIG. 2, to smooth out such vibrations, impulsive forces, or "ripples" of energy. In the event the opposing magnets thereby become mis-aligned, the magnetic attraction between permanent magnet opposite poles serves to re-align the magnets, and thereby the ring 10, planetary members 40 and central member 20, without interruption of operation.

Because the opposed permanent magnets do not grind against each other, but are slightly separated from each other, there is very limited wear associated with operation of the device.

There is thus provided a torque/force transfer apparatus having no gear teeth, but capable of transferring large torque/force loads, of damping motion being transferred, of accommodating impulsive forces and "torque ripple", and of automatic realignment of misaligned magnets.

It is to be understood that the present invention is by no means limited to the particular construction herein disclosed and/or shown in the drawings, but also comprises any modifications or equivalents within the scope of the claims.

What is claimed is:

1. A torque/force transfer apparatus comprising:
   a rigid annular ring having therein permanent first magnets side by side about the interior of said ring, said first magnets being arranged so as to alternate in polar orientation to present an inside circumference of alternating north and south magnetic poles;
   a cylindrical central member having therein permanent second magnets side by side about the exterior of said member, said second magnets being arranged so as to alternate in polar orientation to present an outside circumference of alternating north and south magnetic poles;
   a strut assembly pivotally attached to a center of a side of said central member and having arms extending radially outwardly from said central member center each of said arms being individually pivotally attached to said central member;
   planetary members rotatably connected each to one of said arms, each of said planetary members having therein permanent third magnets side by side about the exterior of the planetary member, said third magnets being arranged so as to alternate in polar orientation to present on outside circumference of alternating north and south magnetic poles, each of said planetary members substantially bridging an annulus defined by said ring inside circumference and said central member outside circumference; and
   whereby rotation of said central member causes, by magnetic flux, rotation of said planetary members which cause, by magnetic flux, rotation of said ring.

2. The apparatus in accordance with claim 1 wherein said planetary members are spaced from said ring and said central member.

\* \* \* \* \*